United States Patent
Köstlin et al.

(10) Patent No.: US 8,177,547 B2
(45) Date of Patent: May 15, 2012

(54) METHOD FOR STARTING A BURNER

(75) Inventors: Berthold Köstlin, Duisburg (DE);
Frank Hannemann, Buckendorf (DE);
Andreas Heilos, Mülheim (DE);
Gerhard Zimmermann, Höchstadt (DE)

(73) Assignee: Siemens Aktiengesellschaft, Munich (DE)

(*) Notice: Subject to any disclaimer, the term of this patent is extended or adjusted under 35 U.S.C. 154(b) by 560 days.

(21) Appl. No.: 11/791,097

(22) PCT Filed: Nov. 15, 2005

(86) PCT No.: PCT/EP2005/055973
§ 371 (c)(1),
(2), (4) Date: May 17, 2007

(87) PCT Pub. No.: WO2006/053866
PCT Pub. Date: May 26, 2006

(65) Prior Publication Data
US 2008/0044782 A1    Feb. 21, 2008

(30) Foreign Application Priority Data
Nov. 18, 2004 (DE) .......... 10 2004 055 763
Feb. 28, 2005 (EP) ................... 05004361

(51) Int. Cl.
*F23Q 9/00*    (2006.01)
(52) U.S. Cl. ........... 431/284; 431/278; 431/2; 431/183; 431/185; 431/9; 60/746; 60/747; 60/748; 60/733; 110/347; 110/262
(58) Field of Classification Search ........... 431/284, 431/278, 2, 183, 8, 185, 9; 60/746, 747, 60/748, 733, 776, 737; 239/400, 403, 405, 239/406; 110/347, 262
See application file for complete search history.

(56) References Cited

U.S. PATENT DOCUMENTS

| | | | | |
|---|---|---|---|---|
| 4,474,120 A * | 10/1984 | Adrian et al. | ........... | 110/261 |
| 4,701,124 A | 10/1987 | Maghon et al. | | |
| 5,062,792 A * | 11/1991 | Maghon | ........... | 431/284 |
| RE33,896 E * | 4/1992 | Maghon et al. | ........... | 431/284 |
| 5,451,160 A | 9/1995 | Becker | | |
| 5,548,952 A * | 8/1996 | Stock et al. | ........... | 60/39.465 |
| 5,573,392 A * | 11/1996 | Paikert et al. | ........... | 431/9 |
| 5,735,681 A * | 4/1998 | Cheng | ........... | 431/10 |
| 6,374,593 B1* | 4/2002 | Ziegner | ........... | 60/772 |
| 6,632,084 B2* | 10/2003 | Berenbrink | ........... | 431/284 |
| 2001/0018173 A1* | 8/2001 | Tiemann | ........... | 431/284 |
| 2007/0033947 A1* | 2/2007 | Rocca | ........... | 60/776 |

FOREIGN PATENT DOCUMENTS

| | | |
|---|---|---|
| DE | 195 49 140 A1 | 7/1997 |
| DE | 195 49 141 A1 | 7/1997 |
| EP | 1 277 920 A1 | 1/2003 |

* cited by examiner

*Primary Examiner* — Steven B McAllister
*Assistant Examiner* — Avinash Savani

(57) ABSTRACT

The invention relates to a method for starting a burner for combusting synthesis gases, wherein said burner comprises first and second fuel passages, the first fuel passage encompasses the second fuel passage in a substantially concentric manner and the gas transferred to the burner is mixed with combusting air and is combusted. According to said invention, in order to start the burner, the second fuel passage is first loaded with a synthesis gas to a predefined burner power at a first starting phase and the first fuel passage is loaded with the synthesis gas at a second starting phase.

3 Claims, 2 Drawing Sheets

METHOD FOR STARTING A BURNER

CROSS REFERENCE TO RELATED APPLICATIONS

This application is the US National Stage of International Application No. PCT/EP2005/055973, filed Nov. 15, 2005 and claims the benefit thereof. The International Application claims the benefits of European application No. 05004361.1 filed Feb. 28, 2005 and German application No. 10 2004 055 763.2 filed Nov. 18, 2004, all of the applications are incorporated by reference herein in their entirety.

FIELD OF INVENTION

The present invention relates to a method for starting a burner, which is designed to combust a synthesis gas and has a first and second fuel passage. The present invention also relates to a burner arrangement for a firing system, in particular a gas turbine combustion chamber.

BACKGROUND OF THE INVENTION

A burner for a gas turbine with a first fuel passage and a second fuel passage, which is encompassed in an essentially concentric manner by the first fuel passage, is disclosed for example in EP 1 277 920. The burner disclosed therein is designed to operate with a synthesis gas, the synthesis gas being split into a first sub-flow and a second sub-flow and the sub-flows being supplied to the burner separately through the first and second fuel passages. Regulation can be present for each sub-flow to supply the sub-flows in a regulated manner. In particular the sub-flows can be adjusted here as a function of the required power of the gas turbine. Regulation can in particular influence the gas mass flow or the respective specific calorific value of the fuel supplied. The calorific value is influenced by introducing natural gas to increase the calorific value or steam and/or nitrogen to reduce the calorific value.

SUMMARY OF INVENTION

Compared with the prior art, the object of the present invention is to develop the method for operating a burner with a first and second fuel passage with synthesis gas further in respect of starting the burner.

It is a further object of the present invention to provide a burner with a first fuel passage and a second fuel passage, the first fuel passage encompassing the second fuel passage in an essentially concentric manner, offering advantages particularly in respect of starting with synthesis gas.

The first object is achieved by a method for starting a burner as claimed in the claims and the second object by a burner arrangement as claimed in the claims. The dependent claims contain advantageous embodiments of the inventive method and respectively the inventive burner arrangement.

In the inventive method for starting a burner, the burner being designed to combust a synthesis gas and having a first and second fuel passage, with the first fuel passage encompassing the second fuel passage in an essentially concentric manner, synthesis gas is supplied to the burner, said synthesis gas being mixed with combustion air and combusted. To start the burner, in an initial phase the second fuel passage is first charged with a synthesis gas to a predetermined burner power. Then in a start phase following on from the initial phase the first fuel passage is charged with synthesis gas.

The inventive method here is based on the knowledge that the overall efficiency of the gas turbine diminishes, the greater the fuel-side pressure loss in the burner receiving the fuel for combustion. A significant variable for pressure loss is the flow resistance of the burner in respect of the flowing synthesis gas.

To achieve the highest possible level of efficiency efforts are made to achieve the lowest possible pressure loss in the fuel passage. On the other hand a minimum exit speed of the synthesis gas is required to maintain a stable flame. This minimum exit speed however requires a specific pressure loss, below which the pressure loss value cannot drop, over the fuel passage. The outflow speed is linked to the pressure loss. The lower the pressure loss over the fuel passage, the lower the outflow speed of the synthesis gas among other things.

The pressure loss over a fuel passage is approximately proportional to the gas mass flow flowing through the passage, the flow resistance of the passage forming the proportionality constant. This means that where the gas mass flow is small, the pressure loss is low, while it is high where the gas mass flow is large. If a gas turbine is to be started at low load, this requires the supply of a small fuel mass flow, resulting in a low pressure loss over the fuel passage compared with the fuel mass flow occurring at full load. Since maintaining a stable flame requires a certain minimum outflow speed of the synthesis gas, the fuel passage must be configured in such a manner that the outflow speed value does not drop below said outflow speed, even when there is a small fuel mass flow, in other words the fuel passage has a certain minimum pressure loss with a small gas mass flow. However this means that with a high fuel mass flow the pressure loss is higher than necessary, resulting in a deterioration in the efficiency of the gas turbine.

The described conflict between a minimum pressure loss, below which the pressure loss value must not drop, with a small fuel mass flow and a low pressure loss with a high fuel mass flow occurs for example when the gas turbine system is started.

When the gas turbine system is started, the inventive method utilizes the fact that the presence of two fuel passages offers a further parameter to optimize the starting of the gas turbine system. This parameter is the appropriate splitting of the fuel flow into two sub-flows, which are supplied through the separate fuel passages, by way of the generally different pressure losses.

In one embodiment of the method in the initial phase only the second, inner fuel passage is charged with synthesis gas. The inner passage generally serves as the fuel passage for a pilot burner and is designed for smaller fuel mass flows than the first fuel passage, which is also referred to as the main fuel passage. In particular it generally has a higher flow resistance compared with the main fuel passage, so that an adequate pressure loss and therefore an adequate outflow speed of the fuel can be ensured even with small fuel mass flows. The sole operation of the second fuel passage therefore allows the system to be started in a manner that is optimized in respect of the supply of relatively small fuel mass flows. In the subsequent start phase, in which the first fuel passage is charged, it is possible to keep up the charging of the second fuel passage. Alternatively it is also possible however not to continue with the charging of the second fuel passage in the start phase. The first fuel passage is then connected in the start phase when the gas turbine power has reached a value, which allows a stable flame to be maintained even when fuel is supplied through the first fuel passage. This power depends inter alia on the flow resistance of the first fuel passage. The lower this flow resistance, the larger the fuel mass flow has to be, which is supplied through the first fuel passage in the start phase.

In one embodiment of the inventive method a continuously increasing fuel mass flow is supplied to the second fuel passage in the initial phase, until the maximum burner power that can be achieved over the second fuel passage is reached.

In order to be able to increase the fuel mass flow to be supplied for a given power of the gas turbine system, without increasing the power, an inert medium can be fed to the synthesis gas. This increases the fuel mass flow but does not take part in combustion, so that the fuel mass flow is higher for the same power than without inert medium. The inert medium can be mixed in with the synthesis gas supplied through the first fuel passage and/or the synthesis gas supplied through the second fuel passage. In particular a large quantity of inert medium can be mixed in with the synthesis gas supplied through the first fuel passage when the first fuel passage is connected in the start phase, in such a manner that a sudden jump in power is prevented during the transition from the initial phase to the start phase. If the inert medium were not added, the synthesis gas mass flow to be supplied as a minimum to maintain a stable flame through the first fuel passage would suddenly increase the power of the gas turbine.

During the further course of the initial phase and/or during the further course of the start phase the proportion of inert medium in the synthesis gas is continuously reduced, in order to adjust the required calorific value of the synthesis gas and therefore the required power of the gas turbine system.

In a development of the inventive method, to start the burner at the beginning of the start phase, a small synthesis gas mass flow is supplied by way of an ignition pilot burner and ignited to form an ignition pilot flame. After ignition the second fuel passage is connected, with the synthesis gas flowing out from the second fuel passage being ignited by way of the ignition pilot flame, to form a pilot flame. The ignition pilot burner is advantageously upstream in relation to any swirl generators present in the second fuel passage.

Synthesis as can be supplied through the second fuel passage in such a manner that the pilot flame is removed from the region of the swirl generators. Removal can perhaps be effected by preventing any interference edges, at which vortex streets may develop. A vortex street comprises two parallel vortex chains, the vortices of the two vortex chains rotating in the counter clockwise direction. Such a vortex street can result in the flame being held in the region of the vortices. This counters the removal of the flame from the region of the swirl generators. The interference edges can be prevented by structuring the second fuel passage in an appropriate manner, for example by not having electric ignitions or pilot gas pipes to supply the ignition pilot gas extending into the second fuel passage or running in it. Vortex streets can also be prevented by not disposing nozzle rings for the discharge of synthesis gas upstream of possible interference edges.

A further possibility for removing the pilot flame from the region of the swirl generators is to reduce the calorific value of the synthesis gas supplied through the second fuel passage in such a manner that a flow speed of the synthesis gas is set, which is significantly higher than the flame speed. Inert medium can be fed to the synthesis gas to reduce the calorific value.

Alternatively the pilot flame can also be ignited by means of the ignition pilot flame downstream of the burner in the combustion chamber. In order to allow ignition of the pilot flame in the combustion chamber with the ignition pilot burner located upstream in relation to the swirl generators in the second fuel passage, it is ensured that the fuel mass flows supplied by way of the ignition pilot burner and over the second fuel passage do not mix before they reach the combustion chamber. In other words the two fuel mass flows are introduced, separately into the combustion chamber, for example in that the second fuel passage has no outlet nozzles for the discharge of fuel in the region of the ignition pilot flame. After ignition of the pilot flame the ignition pilot flame is preferably disconnected. With the described alternative the situation can be achieved that the pilot flame does not burn at all in the burner itself and therefore does not have to be removed from the burner, in particular from the region of the swirl generators.

An inventive burner arrangement for a combustion chamber, in particular for a gas turbine combustion chamber, comprises:

A main burner comprising a first fuel passage to supply a first fuel mass flow, a pilot burner comprising a second fuel passage to supply a second fuel mass flow, with at least one swirl generator being disposed in the region of the second fuel passage, and an ignition pilot burner disposed upstream of the swirl generator to ignite the pilot burner. According to the invention the second fuel passage is configured in such a manner that any interference edges, at which vortex streets may develop, are prevented between the ignition pilot burner and the pilot burner.

The inventive burner arrangement is particularly suitable for implementing the inventive method in the variant, wherein the pilot burner is ignited by means of an ignition pilot flame disposed upstream of the swirl generators. If the synthesis gas is supplied to the pilot burner through the second fuel passage in the initial phase, the inventive embodiment of the burner system allows the pilot flame to, be removed from the region of the swirl generators.

Interference edges can for example be prevented by not disposing fuel nozzles upstream of possible interference edges.

In an advantageous development of the inventive burner arrangement the second fuel passage has no fuel outlets in the region, in which the ignition pilot burner is disposed. If the second fuel passage is fitted for example with one or more nozzle rings with fuel nozzles distributed over the periphery of a nozzle ring, it is possible to dispense with fuel nozzles, in particular in the peripheral segment facing the ignition pilot burner. On the one hand this prevents the ignition pilot burner itself becoming an interference element causing a vortex street and on the other hand the absence of fuel outlets in the second fuel passage in the region of the ignition pilot burner allows the separate introduction of the synthesis gas mass flows supplied by way of the ignition pilot burner and the second fuel passage into the combustion chamber.

BRIEF DESCRIPTION OF THE DRAWINGS

Further embodiments of the present invention will emerge from the description which follows of exemplary embodiments with reference to the accompanying figures, in which.

DETAILED DESCRIPTION OF INVENTION

Figure 1:
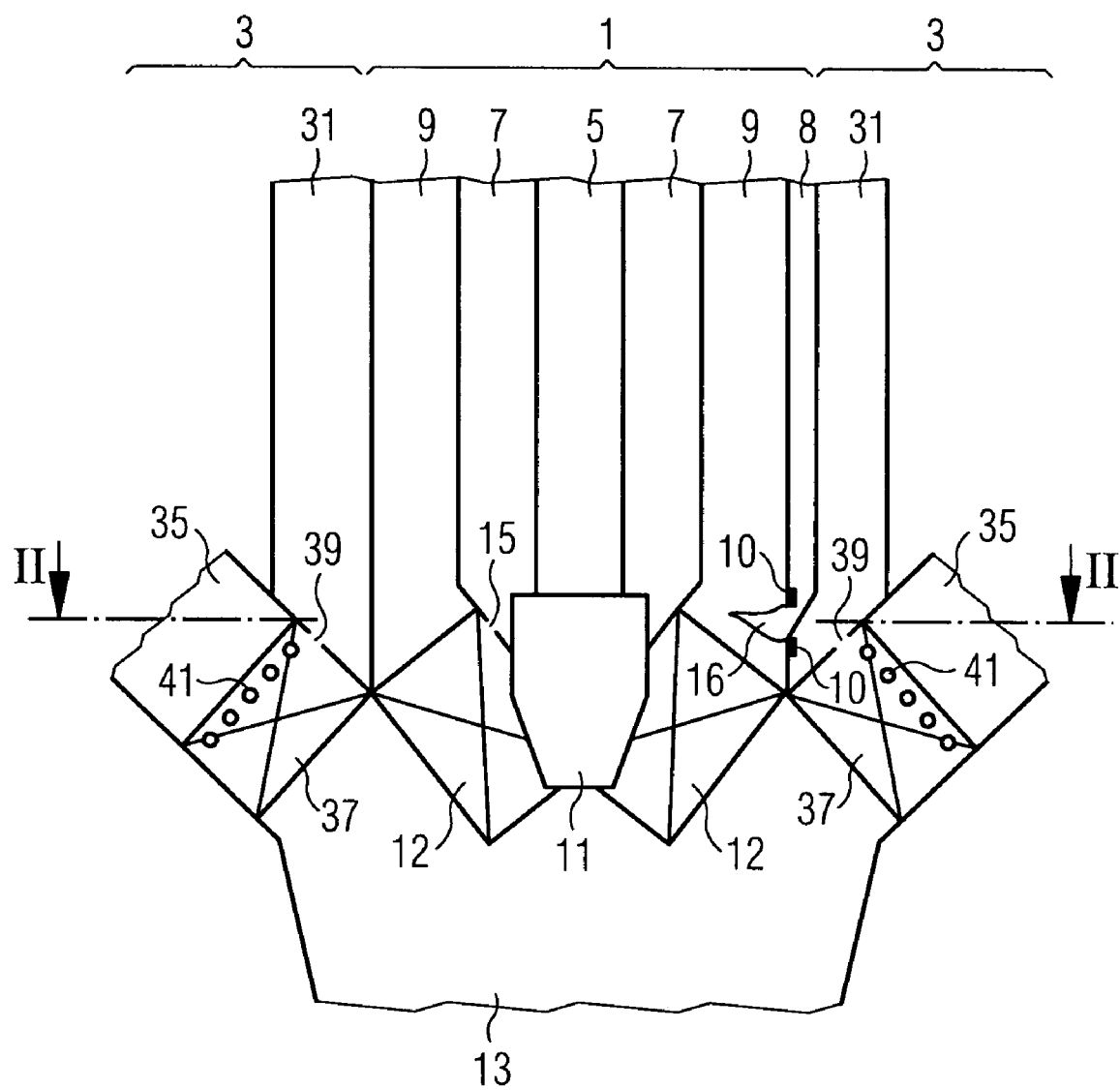
FIG. 1 shows a schematic sectional view of an inventive burner arrangement.

A schematic sectional diagram of an inventive burner arrangement is shown in FIG. 1. The inventive burner arrangement comprises a central burner system 1, which serves as a pilot burner system for the burner arrangement, as well as a main burner system 3 disposed concentrically around the central burner system 3. The main burner system 3 at least is configured as a hybrid burner system, in other words it can be operated both in diffusion and premix mode. The pilot burner system 1 can be operated at least in diffusion mode. While in diffusion mode the fuel is injected directly into the flame, in premix mode the fuel is first mixed with air, before the mixture is supplied to the flame. Operation in premix mode impacts particularly favorably on the pollutant emissions of a gas turbine system.

The central burner system 1 comprises a central supply duct 5 for liquid fuels, a central gas supply passage 7 for the supply of gaseous fuels, in the present exemplary embodiment for the supply of synthesis gas, and a central air supply duct 9 for the supply of air. The central gas supply passage 7 is disposed concentrically around the central supply duct 5 for liquid fuels, which opens into a nozzle 11 for injecting the liquid fuel into the combustion chamber 13. The central air supply duct 9 is in turn disposed concentrically around the central gas supply passage 7.

The central gas supply passage 7 opens by way of outlet nozzles 15 into the central air supply duct 9. Swirl generators 12 are disposed in the opening region to ensure that the synthesis gas is premixed with the air flowing in through the central air supply duct 9, if the burner arrangement is to be operated in premix mode.

The central burner system 1 also comprises an ignition pilot burner, comprising a tubular synthesis gas supply unit 8, which opens into the central air supply duct 9 upstream of the swirl generators 12. The tubular synthesis gas supply unit 8 is configured here to supply a small and where possible undiluted synthesis gas mass flow. An electric ignition 10 is also present in the opening region and this can be used to ignite the gas flowing out of the opening.

The central burner system 1 operates as a pilot burner system and serves to maintain a pilot flame that assists the stability of the burner flame. In principle it allows the operation of the burner as a diffusion burner. The pilot burner is ignited by means of the ignition pilot burner system, which is sometimes also referred to as the secondary pilot burner system.

Figure 2:
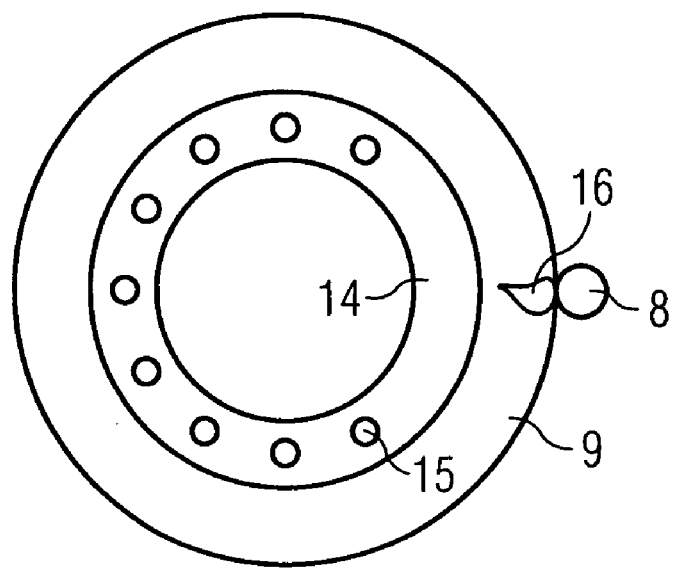
FIG. 2 shows a schematic diagram of a section of the burner along line II-II of FIG. 1.

The nozzle-type outlet openings 15, the tubular synthesis gas supply unit 8 and the central air supply duct 9 are shown schematically in FIG. 2 in a section along the line II-II from FIG. 1. The nozzle-type outlet openings 15 form a nozzle ring 14, which closes off the central gas supply passage 7. The nozzles 15 are distributed over the periphery of the nozzle ring at regular distances from each other. There are no nozzles 15 present in the nozzle ring 14 only in the region opposite the opening of the tubular synthesis gas supply unit 8 into the air supply duct 9. The absence of nozzles 15 in this region serves to prevent interference in the flow present in the air supply duct 9, which could result in vortex streets, which would act as undesirable flame preservers. Also the absence of nozzles allows synthesis gas supplied by way of the central fuel passage 7 only to be ignited in the combustion chamber 13 rather than beforehand in the burner.

In FIG. 1 the synthesis gas supply unit 8 is disposed on the outside of the central air supply duct 9. Alternatively it is also possible to pass the tubular synthesis gas supply unit 8 through the central gas supply passage 7.

The main burner system, which is disposed concentrically around the central burner system 1, comprises a gas supply passage 31, which encloses the central burner system 1 in an annular manner, and an air supply duct 35. Swirl generators 37 are disposed in the air supply duct 35, to swirl the air flowing toward the combustion chamber 13. The region of the supply duct 35, in which the swirl generators 37 are disposed, forms a mixing passage for mixing the synthesis gas with the air flowing in. The swirl generators 37 are configured in a hollow manner at least in part to supply the synthesis gas. These hollow spaces are connected to the outer gas supply passage 31 by way of openings 39. The swirl generators 37 have outlet nozzles 41 at appropriate points, through which outlet nozzles 41 the synthesis gas supplied through the outer gas supply passage 21 can enter the air flow supplied through the air supply duct 35. The outlet nozzles 41 are disposed in the swirl generators in such a manner that the synthesis gas passes at least one segment of the swirl generator 37 together with the air, in order to be able to be mixed thoroughly with the air in premix operation.

A synthesis gas start, in other words when the burner is started with synthesis gas, is described below with reference to FIG. 3, in which the calorific value of the synthesis gas used is plotted against the gas turbine power P.

During a synthesis gas start low-calorie synthesis gas is fed into the combustion zone by way of the central burner system 1 and is ignited there either by way of an ignition pilot flame or an electric ignition. The central burner system 1 is thereby configured as a diffusion burner and has a small effective cross-section, to ensure a sufficiently high flow resistance and therefore a high exit speed with a small synthesis gas mass flow. Once a stable flame has formed at the exit end of the central burner system 1, the load on the gas turbine is increased by increasing the synthesis gas mass flow over the central gas supply passage 7, the gas turbine is synchronized and the gas turbine power is increased until the pressure loss over the central fuel passage 7 reaches the maximum possible value.

Once the maximum possible value has been reached, the main burner system 3 is connected in a regulated manner, said main burner system 3 being configured both as a diffusion burner and as a premix burner. When the main burner system is operational, the central burner system 1 can essentially be disconnected. Alternatively it is also possible to continue to operate both burner systems simultaneously.

The starting of the gas turbine with synthesis gas is particularly advantageous, if an ignition pilot burner, as shown in FIG. 1 and FIG. 2, comprising the synthesis gas supply unit 8, is used to ignite the central burner system 1. A small and where possible undiluted synthesis gas flow is injected into the air supply duct 9 by way of the synthesis gas supply unit 8 and the injected synthesis gas is ignited by way of the electric ignition 10. In the next step the ignition pilot flame 16 burning upstream of the swirl generator 12 is used to ignite the synthesis gas flame of the gas supply passage 7, which is configured as a diffusion flame, and remove it from the region of the swirl generator.

The flame can be removed by preventing interference edges, at which vortex streets may develop, which act as undesirable flame preservers, in the region between the exit opening 10 and the combustion chamber 13. In the burner arrangement shown in FIG. 1 interference edges are prevented by not disposing the tubular synthesis gas supply unit 8 and electric ignition 10 in the air supply duct 9. Also no nozzle rings are disposed upstream of possible interference edges. When the flame is removed from the swirl generators 12 of the central air supply duct 9 and can be maintained by supplying synthesis gas through the central fuel passage 7, the ignition pilot flame 16 can be disconnected.

An alternative option for preventing combustion in the swirl generator 12 of the central air supply duct 9 is to dilute the calorific value of the synthesis gas supplied through the central fuel passage 7 by diluting with an inert medium, for example nitrogen, carbon dioxide or steam, to the extent that it is possible to operate with a high mass flow. The dilution ratio is selected such that a mass flow can be supplied through the central fuel passage 7, which results in a flow speed of the diluted synthesis gas in the region of the swirl generators 12, which is significantly higher than the flame speed. The flame is thus removed from the swirl generators 12.

Reduction of the calorific value of the synthesis gas results in an increase in the mass flow and therefore an increase in the pressure loss over the central fuel passage 7 for a constant gas turbine power. This also results in a smaller maximum fire power over said fuel passage. Therefore a combination of ignition by means of the ignition pilot burner and moderate dilution to reduce the calorific value is particularly favorable.

If, as shown in FIG. 1 and FIG. 2, the nozzle ring 14 of the central fuel passage 7 has no nozzles 15 in its segment opposite the ignition pilot burner 8, it is also possible for the synthesis gas supplied by way of the ignition pilot burner 8 and the central fuel passage 7 only to be mixed in the combustion chamber 13. In this instance the ignition pilot flame 16 supplied by the synthesis gas supply unit of the ignition pilot burner 8 only ignites the synthesis gas supplied over the second fuel passage 7 in the combustion chamber 13, so there is no need to remove the flame of the synthesis gas supplied over the second fuel passage 7 from the swirl generator 12.

Once the gas turbine has been synchronized and the maximum power $P_1$ has been achieved by means of the diluted synthesis gas over the central fuel passage 7, the power of the gas turbine can be further increased by reducing the dilution of the synthesis gas supplied through the central fuel passage 7. In other words, the supplied inert medium is gradually replaced with synthesis gas. This is possible because, in the case of the power $P_1$, the mass flow of an undiluted synthesis gas is already large enough to result in an exit speed, which prevents the flame being drawn back into the swirl generator 12.

Once the maximum burner power $P_2$ that can be achieved over the central fuel passage 7 has been reached, in other words once a maximum possible undiluted synthesis gas mass flow has been supplied, the main passage 3 must be connected, to increase the gas turbine power further. It is also necessary to ensure a minimum exit speed of the synthesis gas for the main fuel passage 31, in other words a minimum pressure loss over the main fuel passage 31, in order to prevent acoustic instabilities or burner overheating. Because of the size of the passage this minimum pressure loss corresponds to approximately 50% of the gas turbine power. Since the maximum possible power, which is possible over the central fuel passage 7, can be much less (approximately 10% to 20%), connecting the main fuel passage 31 would result in a sudden jump in power, which is prevented by supplying a large proportion of inert medium to the synthesis gas supplied through the main fuel passage 31 in a first step of the start phase, in order to reduce the calorific value of the synthesis gas. This allows a high volume flow, whilst keeping the fuel energy content, which reduces the gas turbine power, low at the same time. The supply to the main fuel passage 31 is regulated, with the synthesis gas mass flow supplied over the central fuel passage 7 being adjusted in a regulated manner at the same time.

Figure 3:
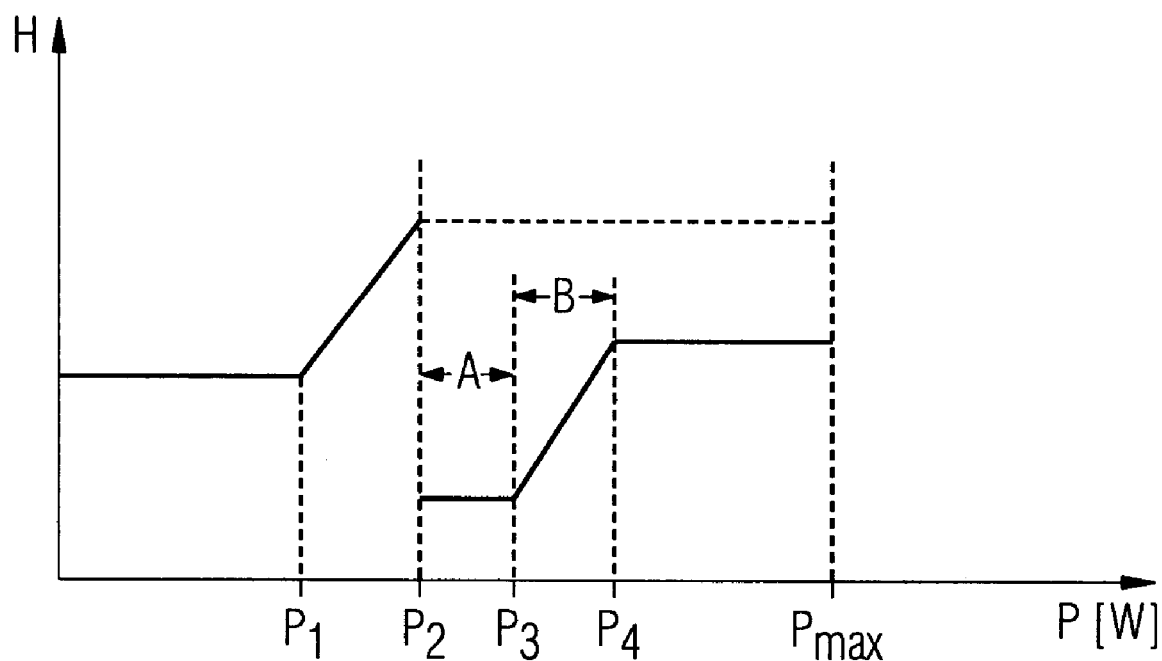
FIG. 3 shows a diagram of an example of an inventive initial and start process of a gas turbine, having a burner with two fuel passages.

In the start phase the synthesis gas mass flow is first increased to the required power $P_3$ for a constant calorific value H of the synthesis gas (segment A in FIG. 3). The large proportion of inert medium is then gradually replaced with synthesis gas in a regulated manner taking into account the permitted gradients, thus setting the required calorific value (B in FIG. 3), until a predetermined power $P_4$ is reached. The power can then be increased to the maximum power $P_{max}$ by increasing the synthesis gas mass flow supplied through the main fuel passage 31.

In an alternative embodiment of the start phase the main fuel passage 31 can be connected even without inert medium. Not all the burners of the gas turbine are then connected at once, only burner groups, which can be activated separately. By connecting burner groups, the synthesis gas mass flow is distributed to fewer burners, thereby resulting in a higher pressure loss per burner. Further burner groups can then be connected gradually, until all the burners are connected.

The invention claimed is:

1. A method for starting a burner designed to combust a synthesis gas, wherein the burner has a first fuel passage and a second fuel passage, the first fuel passage concentrically encompassing the second fuel passage and the synthesis gas is supplied to the burner, mixed with combustion air and combusted, and wherein the second fuel passage is first charged with synthesis gas to a predetermined burner power to start the burner in an initial phase and the first fuel passage is then subsequently charged with synthesis gas in a start phase following the initial phase, comprising:
   supplying a small synthesis gas mass flow via an ignition pilot burner;
   igniting the small synthesis gas mass flow to form an ignition pilot flame;
   initiating a flow of synthesis gas out of the second fuel passage after the ignition pilot flame has been ignited; and
   igniting the second fuel passage gas flow via the ignition pilot flame to form a pilot flame, wherein
   the ignition pilot burner is arranged upstream of a swirl generator and synthesis gas is supplied through the second fuel passage such that the pilot flame is removed from the region of the swirl generator,
   wherein removal is effected by reducing the calorific value of the synthesis gas supplied through the second fuel passage in such a manner that a flow speed of the synthesis gas is set, which is significantly higher than the flame speed,
   wherein the calorific value is reduced by diluting the synthesis gas with an inert medium,
   wherein only the second fuel passage is charged with synthesis gas in the initial phase,
   wherein the second fuel passage is charged with synthesis gas during the start phase,
   wherein during the initial phase a continuously increasing mass flow of synthesis gas is supplied to the second fuel passage to a maximum burner power achievable over the second fuel passage,
   wherein an inert medium is mixed with the synthesis gas to set a required calorific value, and
   wherein when the first fuel passage is connected in the start phase, a large quantity of inert medium is first mixed with the synthesis gas supplied in the first fuel passage such that a sudden jump in power is prevented during the transition from initial phase to start phase.

2. The method as claimed in claim 1, wherein removal is effected by preventing any interference edges, at which vortex streets may develop.

3. A method for starting a burner designed to combust a synthesis gas, wherein the burner has a first fuel passage and a second fuel passage, the first fuel passage concentrically encompassing the second fuel passage and the synthesis gas is supplied to the burner, mixed with combustion air and combusted, and wherein the second fuel passage is first charged with synthesis gas to a predetermined burner power to start the burner in an initial phase and the first fuel passage is then subsequently charged with synthesis gas in a start phase following the initial phase, comprising:

supplying a small synthesis gas mass flow via an ignition pilot burner;

igniting the small synthesis gas mass flow to form an ignition pilot flame;

initiating a flow of synthesis gas out of the second fuel passage after the ignition pilot flame has been ignited; and igniting the second fuel passage gas flow via the ignition pilot flame to form a pilot flame, wherein the ignition pilot burner is arranged upstream of a swirl generator and synthesis gas is supplied through the second fuel passage such that the pilot flame is removed from the region of the swirl generator, wherein removal is effected by reducing the calorific value of the synthesis gas supplied through the second fuel passage in such a manner that a flow seed of the synthesis gas is set, which is significantly higher than the flame speed, wherein the calorific value is reduced by diluting the synthesis gas with an inert medium, wherein only the second fuel passage is charged with synthesis gas in the initial phase, wherein the second fuel passage is charged with synthesis gas during the start phase, wherein during the initial phase a continuously increasing mass flow of synthesis gas is supplied to the second fuel passage to a maximum burner power achievable over the second fuel passage, wherein an inert medium is mixed with the synthesis gas to set a required calorific value, and wherein the proportion of inert medium in the synthesis gas is reduced continuously until the required calorific value is achieved.

* * * * *